United States Patent [19]
Chiang

[11] Patent Number: 6,085,812
[45] Date of Patent: Jul. 11, 2000

[54] WOOD PLANING MACHINE WITH A CARRIAGE LOCKING MECHANISM

[76] Inventor: Pei-Lieh Chiang, No. 12, Nan-Ping St., Nan Dist., Taichung City, Taiwan

[21] Appl. No.: 09/374,918

[22] Filed: Aug. 16, 1999

[51] Int. Cl.[7] ..................................................... B27C 1/00
[52] U.S. Cl. .................. 144/117.1; 144/130; 403/109.1; 403/192; 403/110; 403/372
[58] Field of Search .............................. 144/114.1, 117.1, 144/1.29, 130, 117.2; 403/109.1, 110, 186, 192, 202, 372

[56] References Cited

U.S. PATENT DOCUMENTS

| | | | |
|---|---|---|---|
| 5,829,499 | 11/1998 | Liao | 144/130 |
| 5,967,205 | 10/1999 | Welsh et al. | 144/130 |

*Primary Examiner*—W. Donald Bray
*Attorney, Agent, or Firm*—Brooks & Kushman P.C.

[57] ABSTRACT

A planing machine includes a carriage locking mechanism disposed above a cutter carriage, which in turn, is connected movably to upstanding posts of a machine base that is disposed below the cutter carriage. The locking mechanism includes a pair of post embracing members, each having elongate plate portion that extends at one side of a respective pair of the posts, and two post embracing portions that are connected to opposite ends of the plate portion and that embrace the respective pair of the posts. The post embracing portions are anchored on the carriage. Two axially aligned tubular sockets are threaded internally in different directions and are mounted on the plate portions of the post embracing members. A regulating rod has opposite end portions that are threaded externally in different directions for threaded engagement with the sockets, respectively.

7 Claims, 8 Drawing Sheets

WOOD PLANING MACHINE WITH A CARRIAGE LOCKING MECHANISM

BACKGROUND OF THE INVENTION

1. Field of the Invention

The invention relates to a wood planing machine, more particularly to a wood planing machine which is provided with a carriage locking mechanism for releasably locking a cutter carriage thereof.

2. Description of the Related Art

Referring to FIGS. 1 and 2, a conventional wood planing machine 10 according to U.S. Pat. No. 5,771,949 is shown to include a machine base 11, left and right pairs of upstanding posts 12, and a cutter carriage 13.

As illustrated, the machine base 11 has opposite mounting sides 111 spaced apart from each other in a transverse direction, and opposite feed-in and take-out sides spaced apart from each other in a longitudinal direction. The upstanding posts 12 (only one is shown in FIG. 2) extend upward from the machine base 11 at the mounting sides 111. The cutter carriage 13 is disposed above the machine base 11, and has opposite end portions 130 mounted movably on the upstanding posts 12 for sliding movement of the cutter carriage 13 along the upstanding posts 12. A cutter device 140 (see FIG. 3) is mounted on the cutter carriage 13, and is rotatable about a horizontal axis that extends in the transverse direction.

A pair of screw rods 15 (see FIG. 2) are mounted rotatably on, and extend upwardly from the machine base 11 at the mounting sides 111 to pass threadedly through the cutter carriage 13 at the opposite end portions 130 thereof. The screw rods 15 have lower ends coupled with the transmission rod 14 (see FIG. 3) via a gear assembly which are also disposed in the machine base 11. A turning handle 16 is provided at the top end of one of the screw rods 15 such that rotation of the latter will cause the cutter carriage 13 to slide along the upstanding posts 12 so as to define a gap between the cutter carriage 13 and the machine base 11 for passage of a work piece 17 to be processed.

As best illustrated in FIGS. 3, 4 and 5, a carriage locking mechanism 20 includes a manually operable handle 21, two pairs of locking linkages 22 mounted respectively on two opposite ends of the handle 21, and four post clamps 23 anchored on the cutter carriage 40 and associated with the upstanding posts 12, respectively. Each of the locking linkages 22 includes first and second linkage members 221, 222 connected pivotally to each other at inner ends thereof and to the handle 21, and further connected pivotally to an adjacent pair of the post clamps 23 at outer ends thereof. Each of the second linkage members 222 is formed as two sliding pieces with a biasing spring 223 disposed therebetween. The handle 21 is movable against biasing action of the spring 223 from a releasing position (see FIG. 4) to a locking position (see FIG. 5), where an adjacent pair of the post clamps 23 are forced toward a respective one of the right and left pairs of the upstanding posts 12. At the locking position, the first and second linkage members 221, 222 are disposed in a straight line. Thus, the carriage 13 is locked relative the upstanding posts 12 so as to retain the same at a desired height relative to the machine base 11.

Some disadvantages that result from the use of the aforesaid conventional wood planing machine are as follows:

(i) It is noted that the carriage locking mechanism 20 employed in the conventional wood planing machine 10 includes a relatively large number of components, thereby resulting in a relatively long assembly time.

(ii) Fatigue of the springs 223 due to long tern use of the locking mechanism 20 will weaken the locking strength of the post clamps 23 relative to the upstanding posts 12.

SUMMARY OF THE INVENTION

Therefore, the object of this invention is to provide a wood planing machine which is clear of the aforementioned drawbacks that result from the use of the conventional wood planing machine.

Accordingly, the wood planing machine of the present invention includes a machine base, left and right pairs of upstanding posts, a cutter carriage, moving means, and a carriage locking mechanism. The machine base has opposite mounting sides spaced apart from each other in a transverse direction, and feed-in and take-out sides disposed apart from each other in a longitudinal direction. The upstanding posts extend upward from the machine base at the mounting sides. The cutter carriage is disposed above the machine base, and has opposite end portions mounted movably on the upstanding posts for sliding movement of the cutter carriage along the upstanding posts. The moving means moves the cutter carriage along the upstanding posts for adjusting the height of the cutter carriage relative to the machine base. The carriage locking mechanism locks the cutter carriage at a desired height relative to the machine base, and includes a pair of post embracing members disposed above the cutter carriage, each having an elongate plate portion that extends in the longitudinal direction at one side of a respective one of the left and right pairs of upstanding posts, and two post embracing portions that are connected to opposite ends of the elongate plate portion for embracing a respective one of the upstanding posts. Each of the post embracing members is anchored on the cutter carriage. A pair of axially aligned tubular sockets are threaded internally in different directions. Each of the sockets has one end mounted securely on the elongate plate portion of a respective one of the post embracing members, and extends in the transverse direction between a respective one of the left and right pairs of upstanding posts. A regulating rod is disposed above the cutter carriage in the transverse direction, and has opposite end portions that are threaded externally in different directions for threaded engagement with the tubular sockets, respectively. Axial rotation of the regulating rod in a first direction results in movement of the tubular sockets toward each other such that the elongate plate is portions of the post embracing members are forced toward the respective one of the left and right pairs of upstanding posts to lock the cutter carriage on the upstanding posts and arrest movement of the cutter carriage along the upstanding posts. Axial rotation of the regulating rod in a second direction opposite to the first direction results in movement of the sockets away from each other such that the elongate plate portions of the post embracing members are forced away from the respective one of the left and right pairs of upstanding posts to unlock the cutter carriage from the upstanding posts and permits movement of the cutter carriage along the upstanding posts.

Preferably, each of the post embracing members is formed from a resilient metal plate.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
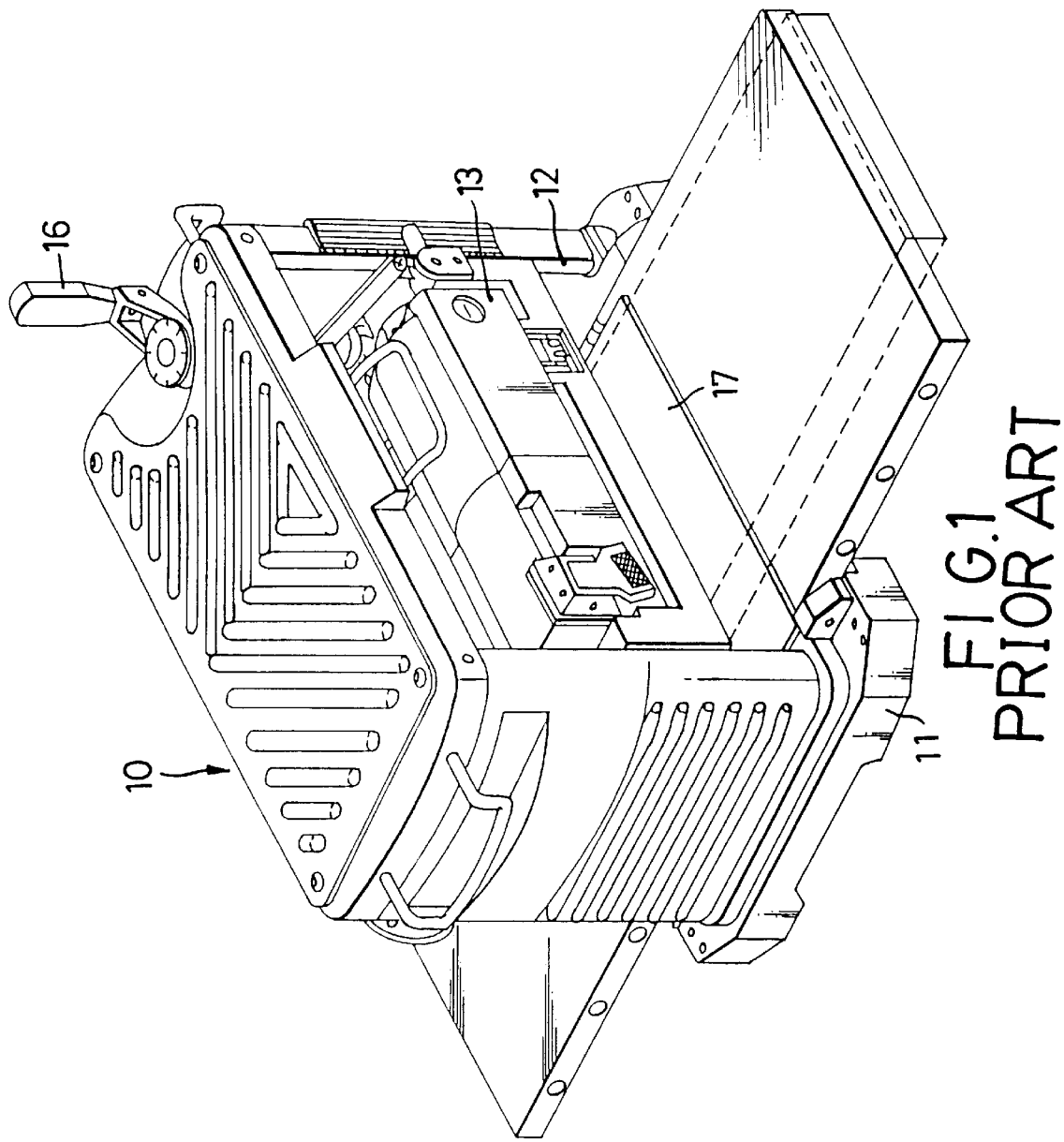
FIG. 1 is a perspective view of a conventional wood planing machine disclosed in U.S. Pat. No. 5,771,949.
Figure 2:
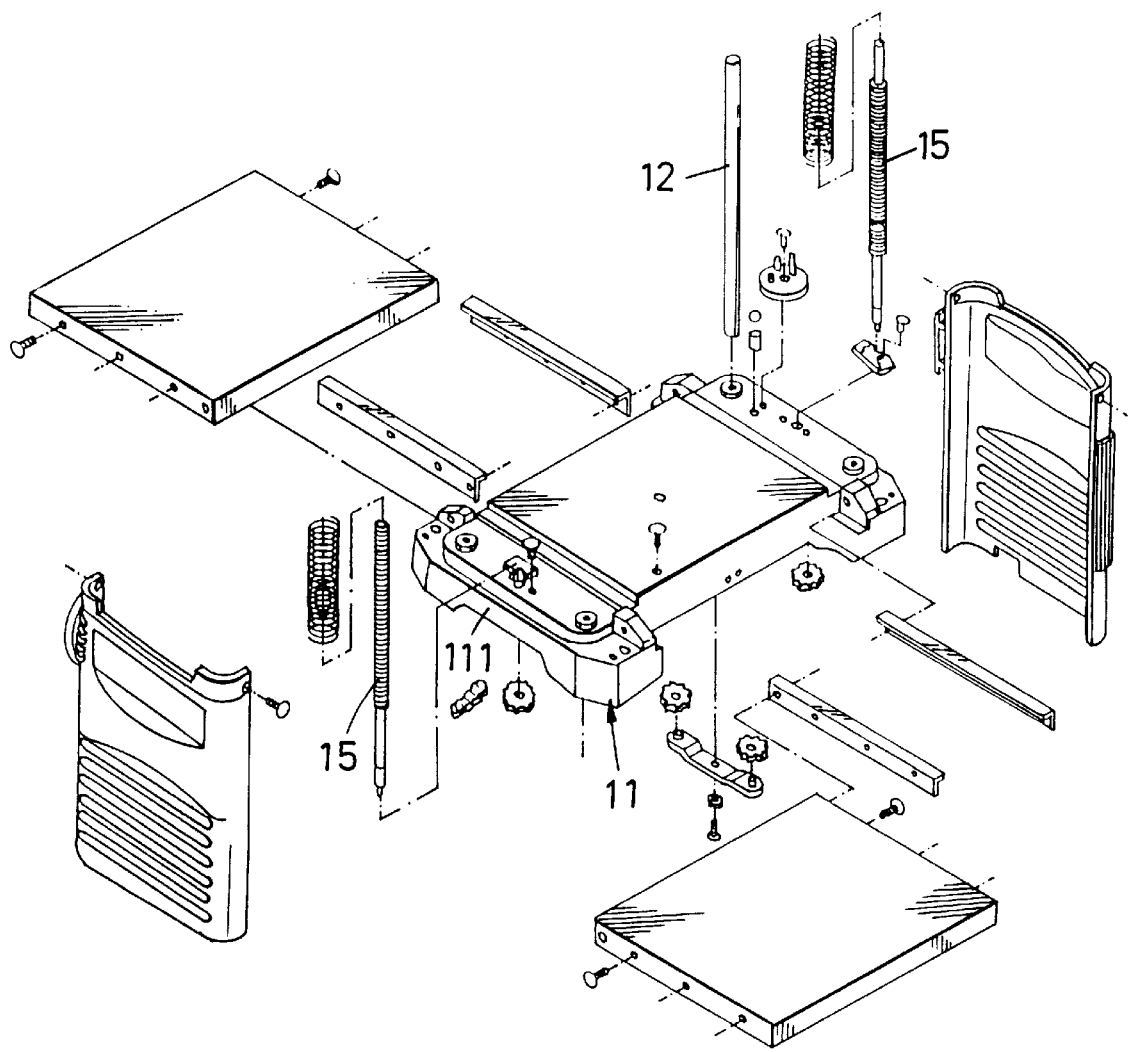
FIG. 2 is a fragmentary exploded view of the conventional wood planing machine of FIG. 1.
Figure 3:
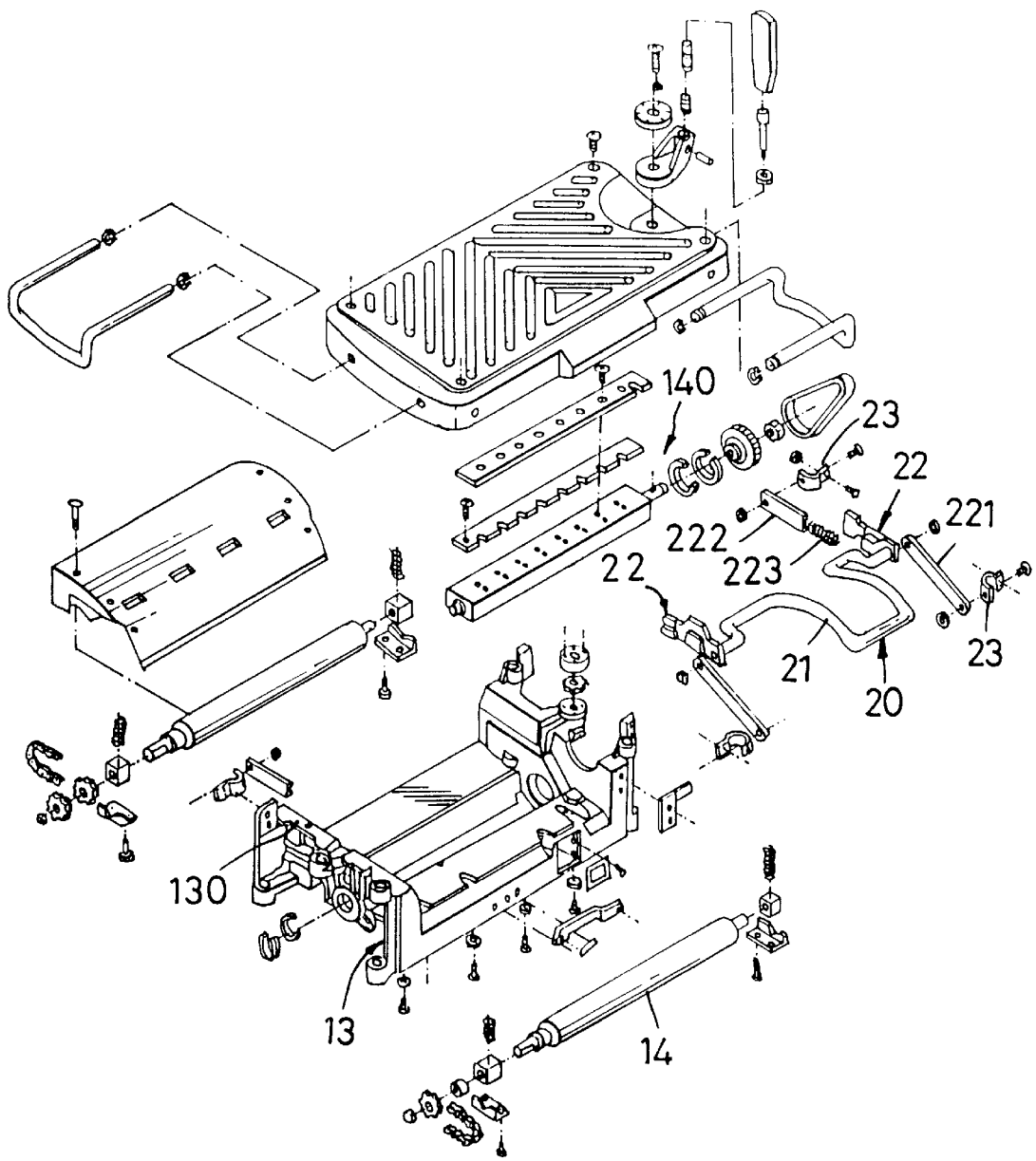
FIG. 3 is another fragmentary exploded view of the conventional wood planing machine of FIG. 1, illustrating how a carriage locking mechanism is mounted therein.
Figure 4:
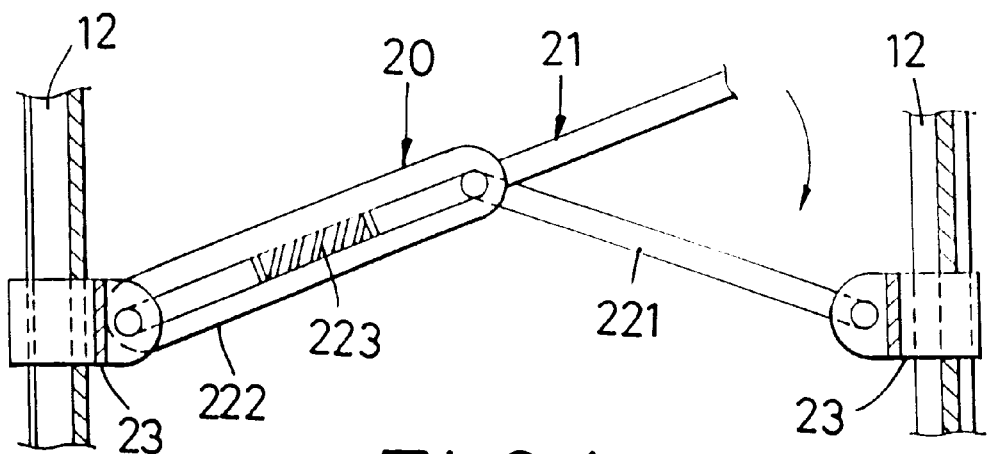
FIG. 4 is a fragmentary and schematic view of the wood planing machine of FIG. 1, illustrating the carriage locking mechanism in a releasing position.
Figure 5:
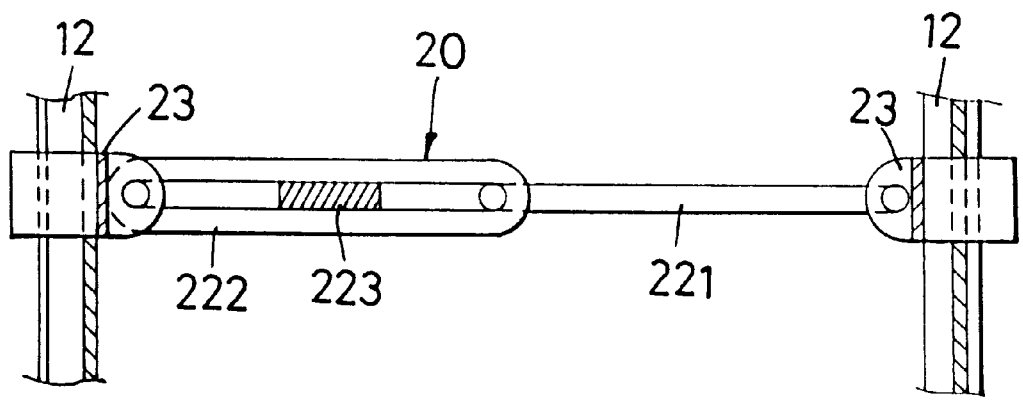
FIG. 5 is a fragmentary and schematic view of the wood planing machine of FIG. 1, illustrating the carriage locking mechanism in a locking position.
Figure 6:
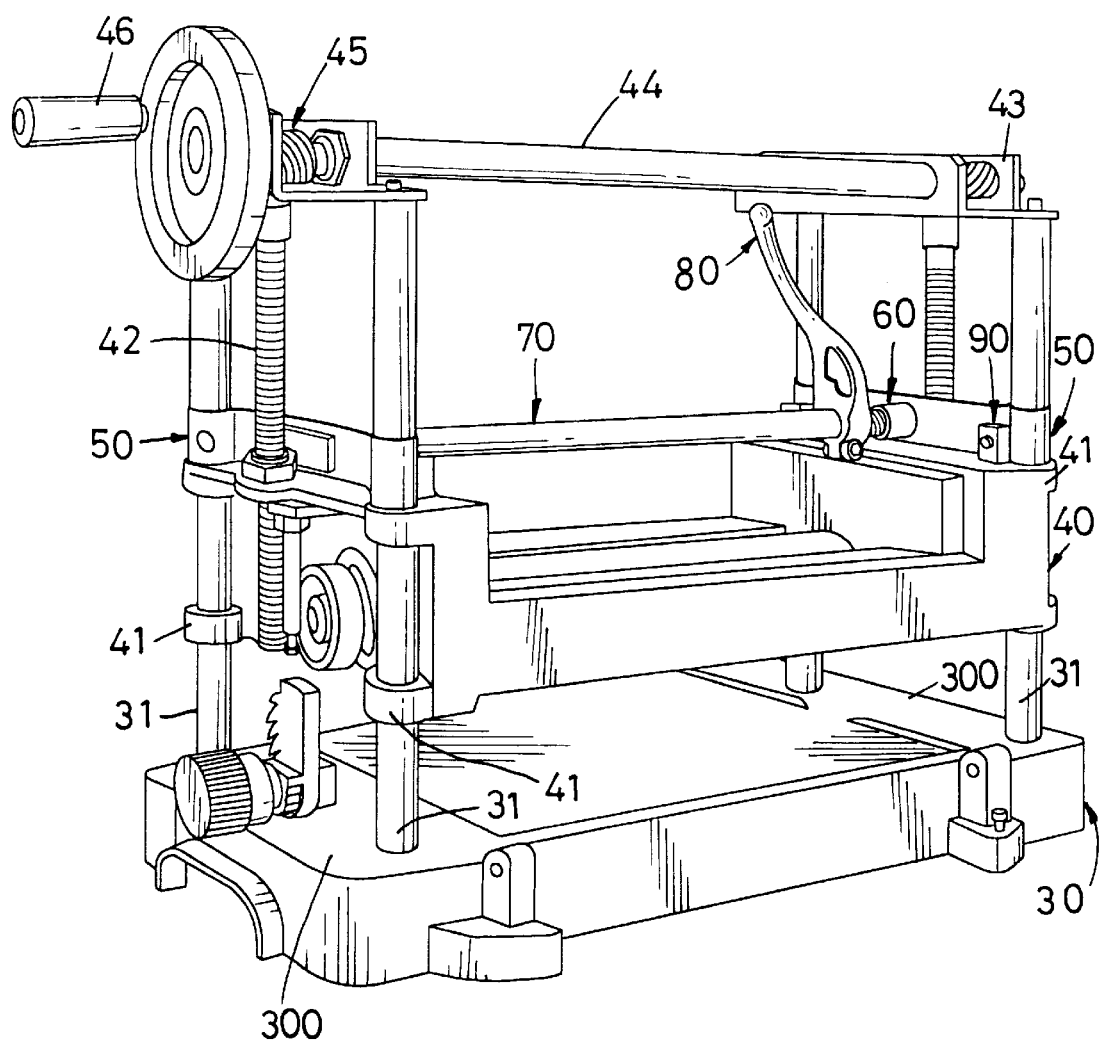
FIG. 6 is a perspective view of the preferred embodiment of a wood planing machine according to the present invention.
Figure 7:
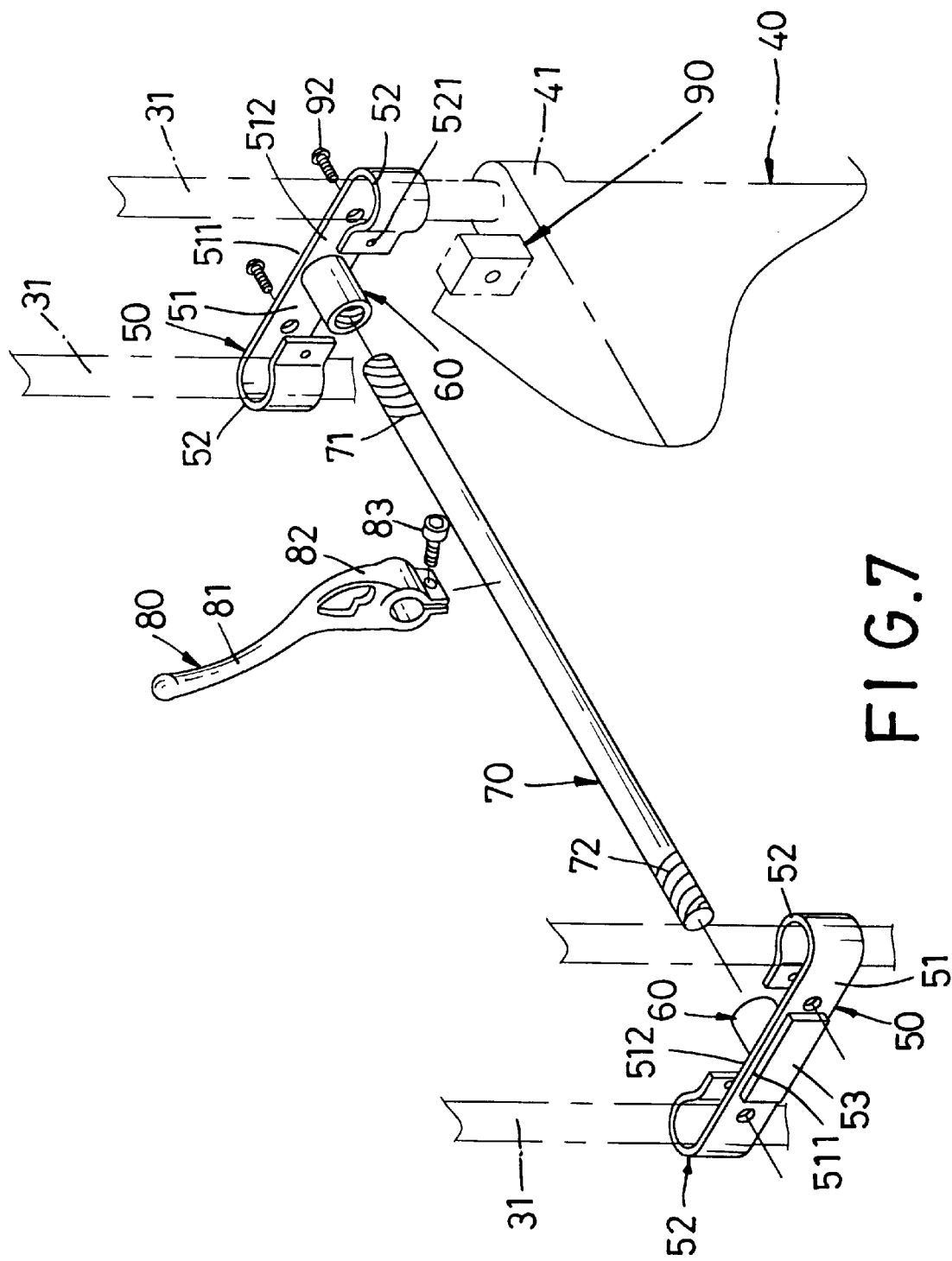
FIG. 7 is a fragmentary exploded view of the preferred embodiment, illustrating how a carriage locking mechanism is mounted on a cutter carriage thereof.

Referring to FIGS. 6 and 7, the preferred embodiment of a wood planing machine of this invention is shown to include a machine base 30, left and right pairs of upstanding posts 31, a cutter carriage 40, moving means, and a carriage locking mechanism.

As illustrated, the machine base 30 has opposite mounting sides 300 spaced apart from each other in a transverse direction, and feed-in and take-out sides disposed apart from each other in a longitudinal direction.

The upstanding posts 31 are mounted on and extend upward from the machine base 30 at the mounting sides 300.

The cutter carriage 40 is disposed above the machine base 30, and has opposite end portions 41 mounted movably on the upstanding posts 31 for sliding movement of the cutter carriage 40 along the upstanding posts 31.

The moving means includes a pair of mounting brackets 43, a pair of screw rods 42, a rotary rod 44, and a worm drive mechanism 45. The mounting brackets 43 are mounted on distal top ends of the upstanding posts 31 so as to be spaced apart from each other in the transverse direction. The screw rods 42 are mounted rotatably on the mounting brackets 43 and pass threadedly through the cutter carriage 40. The rotary rod 44 is disposed in the transverse direction between the mounting brackets 43 and are journalled rotatably on the mounting brackets 43. The worm drive mechanism 45 interconnects the rotary rod 44 and the screw rods 42. A control wheel 46 is mounted on one end of the rotary rod 44 such that rotation the same will move the cutter carriage 40 along the upstanding posts 31 so as to adjust the height of the cutter carriage 40 relative to the machine base 30.

A cutter device (not shown) is mounted rotatably on the cutter carriage 40 in the conventional manner. Since the structure of the cutter device is not pertinent to the present invention, a detailed description thereof will be omitted herein for the sake of brevity.

Figure 8:
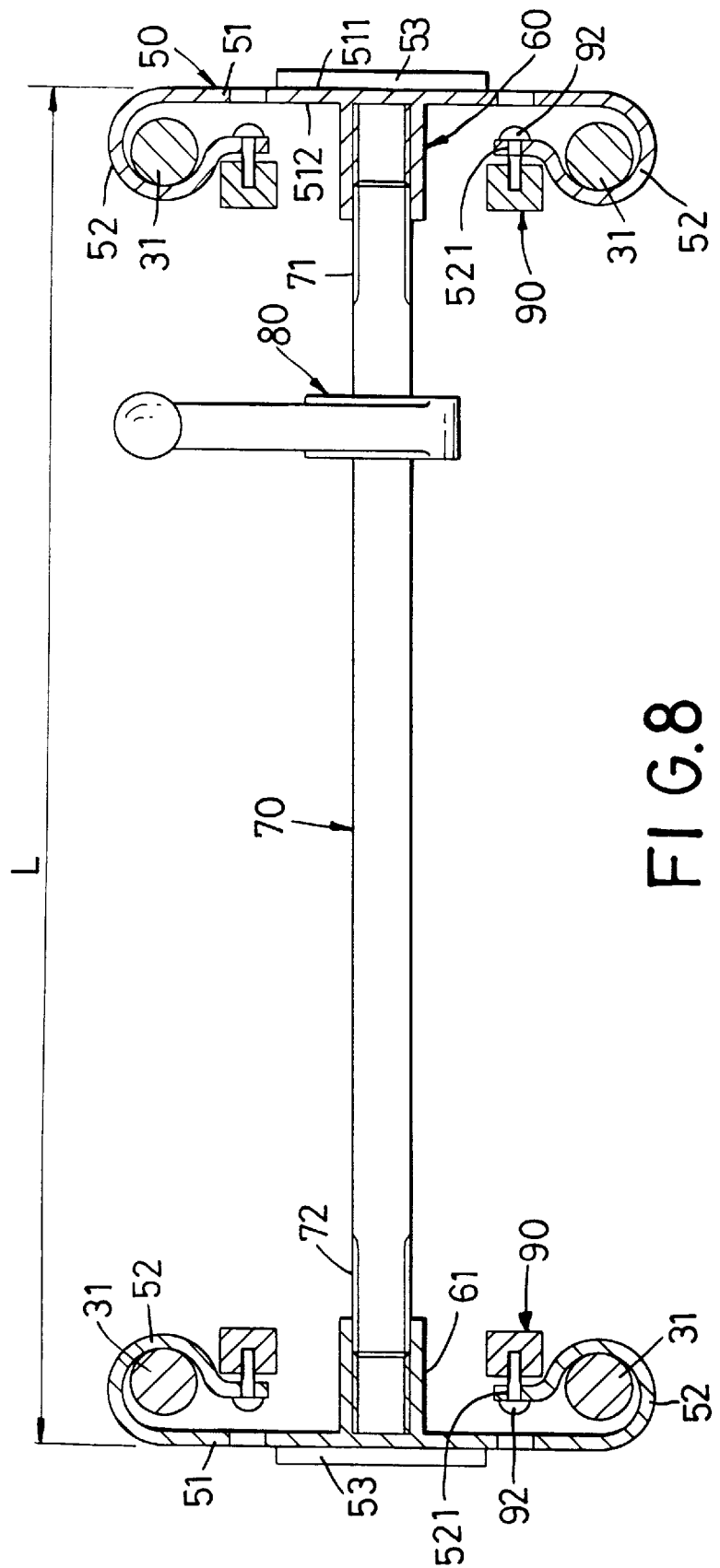
FIG. 8 is a schematic top sectional view of the preferred embodiment, illustrating how the cutter carriage is unlocked relative to left and right pairs of the upstanding posts employed in the preferred embodiment.
Figure 9:
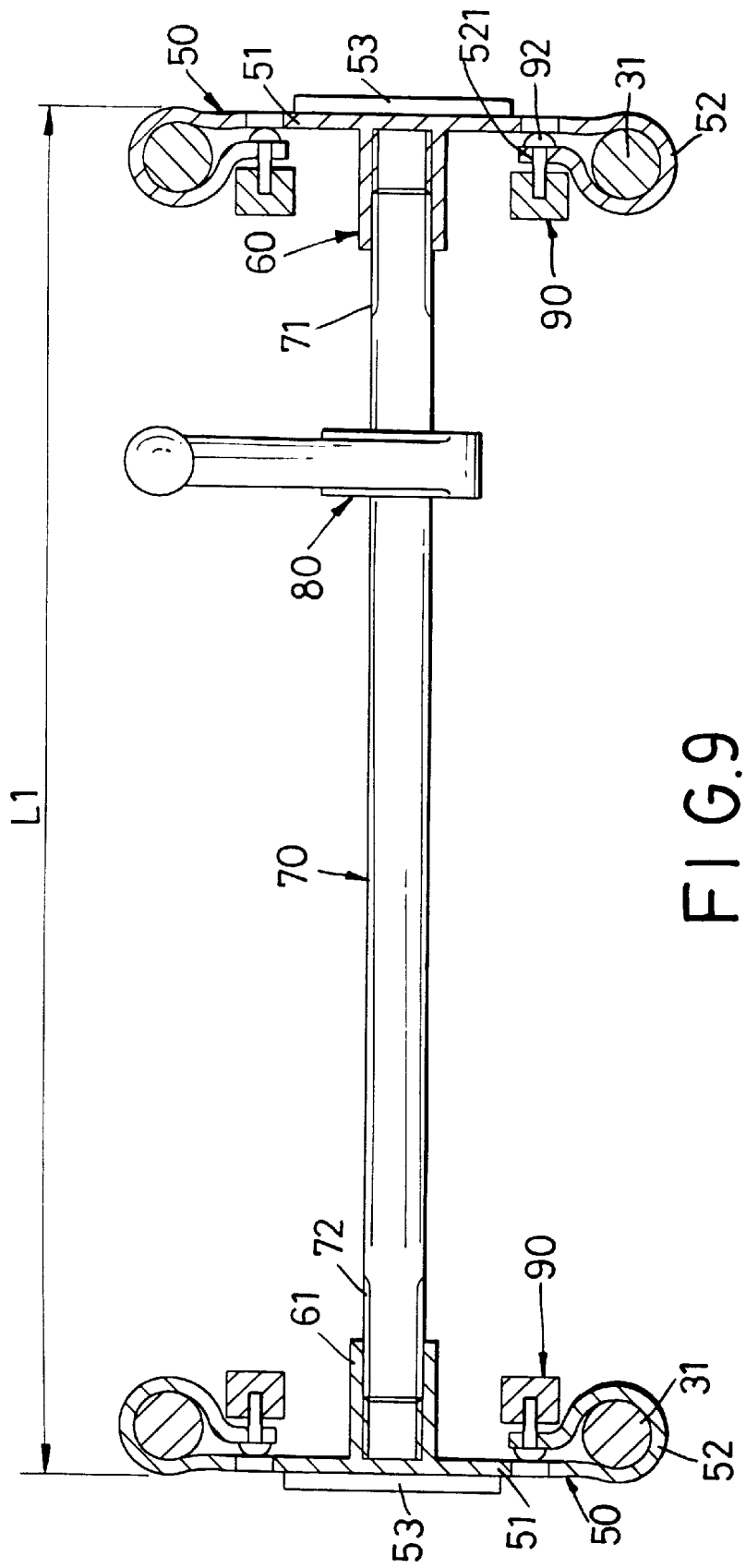
FIG. 9 is another schematic top sectional view of the preferred embodiment, illustrating how the cutter carriage is locked relative to the left and right pairs of upstanding posts employed in the preferred embodiment.

The carriage locking mechanism locks the cutter carriage 40 at a desired height relative to the machine base 30, and includes a pair of post embracing members 50, a pair of tubular sockets 60,61, and a regulating rod 70. Each of the post embracing members 50 is disposed above the cutter carriage 40, and has an elongate plate portion 51 that extends in the longitudinal direction at one side of a respective one of the left and right pairs of upstanding posts 31, and two post embracing portions 52 that are connected to opposite ends of the elongate plate portion 51 for embracing a respective one of the upstanding posts 31. Each of the post embracing members 50 is anchored on the cutter carriage 40. The tubular sockets 60,61 extend axially relative to the regulating rod 70 and are threaded internally in different directions. Each of the tubular sockets 60, 61 has one end mounted securely on an inner side 512 of the elongate plate portion 51 of a respective one of the post embracing members 50, and extends in the transverse direction between a respective one of the left and right pairs of upstanding posts 31. The regulating rod 70 is disposed above the cutter carriage 40 in the transverse direction, and has opposite end portions 71, 72 that are threaded externally in different directions for threaded engagement with the tubular sockets 60, 61, respectively. Under such a condition, axial rotation of the regulating rod 70 in a first direction results in movement of the tubular sockets 60, 61 toward each other such that the elongate plate portions 51 of the post embracing members 50 are forced toward the respective one of the left and right pairs of upstanding posts 31 to lock the cutter carriage 40 on the upstanding posts 31 and arrest movement of the cutter carriage 40 along the upstanding posts 31, as best shown in FIG. 9. Accordingly, axial rotation of the regulating rod 70 in a second direction opposite to the first direction results in movement of the tubular sockets 60,61 away from each other such that the elongate plate portions 51 of the post embracing members 50 are forced away from the respective one of the left and right pairs of upstanding posts 31 to unlock the cutter carriage 40 from the upstanding posts 31 and permit movement of the cutter carriage 40 along the upstanding posts 31, as best shown in FIG. 8. Note that the distance (L) in FIG. 8 is greater than the distance (L1) in FIG. 9.

Each of the post embracing members 50 is preferably formed from a resilient metal plate. Each of the post embracing portions 52 extend integrally from the respective end of the elongate plate portion 51 and around the respective one of the upstanding posts 31 to the other side of the respective one of the left and right pairs of upstanding posts 31. Each of the opposite end portions 41 of the cutter carriage 40 is provided with a pair of anchoring blocks 90 (only one is shown in FIG. 7) for coupling securely with the post embracing portions 52 of a respective one of the post embracing members 50 at the other side of the respective one of the left and right pairs of upstanding posts 31.

Four screw fasteners 92 are provided for mounting the post embracing portions 52 of the post embracing members 50 on the anchoring blocks 90. Each of the post embracing portions 52 is preferably formed with a flat section 521 to facilitate anchoring with the corresponding one of the anchoring blocks 90.

The elongate plate portion 51 of each of the post embracing members 50 has an outer side 511 that is disposed opposite to the respective one of the tubular sockets 60,61 and that has a reinforcing plate 53 mounted securely thereon. A handle 80 is mounted on the regulating rod 70 to control axial rotation thereof in the first and second directions. The handle 80, preferably, has an operating portion 81 and a clamping portion 82 disposed around and fastened on the regulating rod 70 via a screw fastener 83.

Note that the carriage locking mechanism employed in the preferred embodiment includes a relatively small number of components since the post embracing member 50 and the sockets 60 are of a one-piece construction. Moreover, since no springs are employed in the carriage locking mechanism, the possibility of weakening of the locking strength of the post embracing members 50 relative the upstanding posts 31 due to spring fatigue as encountered in the prior art can be eliminated.

With this invention thus explained, it is apparent that numerous modifications and variations can be made without departing from the scope and spirit of this invention. It is therefore intended that this invention be limited only as indicated in the appended claims.

I claim:

1. A wood planing machine comprising:

a machine base having opposite mounting sides spaced apart from each other in a transverse direction, and feed-in and take-out sides disposed apart from each other in a longitudinal direction;

left and right pairs of upstanding posts extending upward from said machine base at said mounting sides;

a cutter carriage disposed above said machine base, and having opposite end portions mounted movably on said upstanding posts for sliding movement of said cutter carriage along said upstanding posts;

moving means for moving said cutter carriage along said upstanding posts and for adjusting a height of said cutter carriage relative to said machine base; and a carriage locking mechanism for locking said cutter carriage at a desired height relative to said machine base, said carriage locking mechanism including a pair of post embracing members disposed above said cutter carriage, each having an elongate plate portion that extends in the longitudinal direction at one side of a respective one of said left and right pairs of upstanding posts, and two post embracing portions that are connected to opposite ends of said elongate plate portion for embracing a respective one of said upstanding posts, each of said post embracing members being anchored on said cutter carriage, a pair of axially aligned tubular sockets that are threaded internally in different directions, each of said sockets having one end mounted securely on said elongate plate portion of a respective one of said post embracing members and extending in the transverse direction between a respective one of said left and right pairs of upstanding posts, and a regulating rod disposed above said cutter carriage in the transverse direction and having opposite end portions that are threaded externally in different directions for threaded engagement with said sockets, respectively, axial rotation of said regulating rod in a first direction resulting in movement of said sockets toward each other such that said elongate plate portions of said post embracing members are forced toward the respective one of said left and right pairs of upstanding posts to lock said cutter carriage on said upstanding posts and arrest movement of said cutter carriage along said upstanding posts, axial rotation of said regulating rod in a second direction opposite to the first direction resulting in movement of said sockets away from each other such that said elongate plate portions of said post embracing members are forced away from the respective one of said left and right pairs of upstanding posts to unlock said cutter carriage from said upstanding posts and permit movement of said cutter carriage along said upstanding posts.

2. The wood planing machine as defined in claim 1, wherein each of said post embracing members is formed from a resilient metal plate.

3. The wood planing machine as defined in claim 2, wherein each of said post embracing portions extends integrally from the respective ends of said elongate plate portion and extends around the respective one of said upstanding posts to the other side of the respective one of said left and right pairs of upstanding posts.

4. The wood planing machine as defined in claim 3, wherein each of said opposite end portions of said cutter carriage is provided with a pair of anchoring blocks for coupling securely with said post embracing portions of a respective one of said post embracing members at the other side of the respective one of said left and right pairs of upstanding posts.

5. The wood planing machine as defined in claim 4, wherein said carriage locking mechanism further includes a plurality of screw fasteners for mounting said post embracing portions of said post embracing members on said anchoring blocks.

6. The wood planing machine as defined in claim 2, wherein said elongate plate portion of each of said post embracing members has one side opposite to the respective one of said sockets with a reinforcing plate mounted securely thereon.

7. The wood planing machine as defined in claim 1, wherein said regulating rod has a handle mounted thereon to control axial rotation thereof in the first and second directions.

* * * * *